(No Model.)
T. J. MILAND.
DRAFT EQUALIZER.
No. 483,938. Patented Oct. 4, 1892.
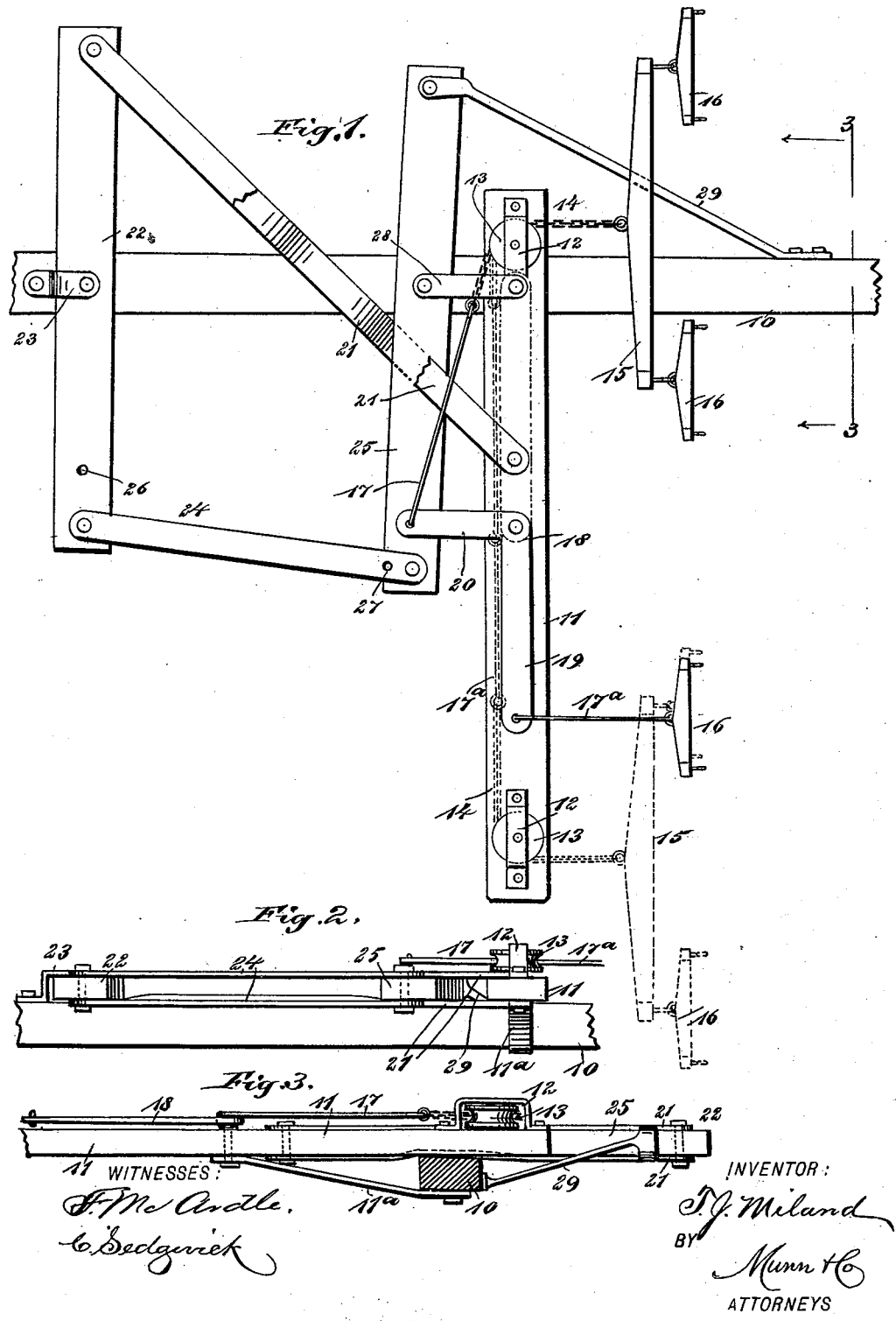
WITNESSES:
F. McArdle.
C. Sedgwick.
INVENTOR:
T. J. Miland
BY Munn & Co
ATTORNEYS
THE NORRIS PETERS CO., PHOTO-LITHO., WASHINGTON, D. C.

UNITED STATES PATENT OFFICE.

THEODOR J. MILAND, OF WHITE, SOUTH DAKOTA.

DRAFT-EQUALIZER.

SPECIFICATION forming part of Letters Patent No. 483,938, dated October 4, 1892.

Application filed December 29, 1891. Serial No. 416,448. (No model.)

*To all whom it may concern:*

Be it known that I, THEODOR J. MILAND, of White, in the county of Brookings and State of South Dakota, have invented a new and Improved Draft-Equalizer, of which the following is a full, clear, and exact description.

My invention relates to improvements in draft-equalizers, and especially to equalizers which are adapted for use on harvesting-machines.

The object of my invention is to produce a simple, strong, and durable equalizer which may be easily attached to a pole, so as not to weaken the latter, which will enable one horse to do work on one side of the pole and several horses on the other side without making any side draft, which may be quickly changed so as to be used with either three or four horses, and which will not easily get out of repair.

To this end my invention consists in a draft-equalizer, the construction of which will be hereinafter described and claimed.

Reference is to be had to the accompanying drawings, forming a part of this specification, in which similar figures of reference indicate corresponding parts in all the views.

Figure 1 is a plan view of the equalizer embodying my invention, showing it applied to a pole. Fig. 2 is a broken side elevation of the same, and Fig. 3 is a broken cross-section on the line 3 3 in Fig. 1.

The pole 10 is of the usual kind and is attached to the harvester or other machine in the usual way, and pivoted on the pole and extending at a right angle thereto is a lever 11, which is strengthened and supported by a brace 11$^a$, extending from the under side of the tongue to the lever, and pivoted in keepers 12 at the ends of the lever are pulleys 13, over which run the drawing-chains 14, which are adapted to carry the eveners 15, to which the singletrees 16 are secured in the usual manner. The inner ends of the chains 14 are connected with rods 17 and 17$^a$, which are hooked together at the ends, as shown by dotted lines in Fig. 1, when the device is used with four horses; but when three horses are used the outer chain 14 is dispensed with and the rod 17$^a$ is connected with a singletree and with the longer arm 19 of a bell-crank 18, which is pivoted on the lever 11, and the rod 17 is pivotally connected with the shorter arm 20 of the bell-crank. It will thus be seen that the horse pulling on the rod 17 and the longer arm 19 of the bell-crank, will by reason of the leverage of the longer arm, balance the pair of horses pulling on the outer end of chain 14 and rod 17; but the pull on the lever 11 will have a tendency to throw it forward so as to create a side draft, and this movement is prevented or neutralized by the draw-bars 21, which are pivoted to the upper and lower sides of the lever 11 and extend diagonally rearward across the pole 10, where they are pivoted to an evener-bar 22, which bar is pivoted in a keeper 23 on the pole 10, and one end of the evener-bar is pivotally connected by means of draw-bars 24 with another evener-bar 25, which is also pivoted near the middle on the pole 10, and is substantially parallel with the evener-bar 22.

The evener-bar 22 is provided with holes 26 near one end to facilitate the exact adjustment of the draw-bars 24, and the draw-bars are also provided with holes 27, which facilitate their adjustment to the front evener-bar 25. The draw-bars 21 and 24, as shown in the drawings, are double—that is to say, they are connected above and below to the evener-bars and to the lever 11; but it will be understood that for all practical purposes they are the same as a single bar.

The forward movement of the free end of the lever 11, acting on the draw-bars 21, pulls forward one end of the evener-bar 22, thus moving back the opposite end, which, acting on the draw-bars 24, pulls backward one end of the evener-bar 25, and the opposite end of the evener-bar 25 is secured to a strong brace 29, which extends forward and is fastened securely to the pole 10. The evener-bar 25 is strengthened at its pivot by a strap 28, extending forward so as to receive the pivot-pin of the lever 11.

From the foregoing description it will be seen that the side draft of the lever 11 is neutralized by the draw-bars 21 and the evener-bar 22, and that the back draft of the evener-bar 22 is neutralized by the draw-bars 24 and evener-bar 25, and that the movement of the latter is taken up by the bar 29 and the pole 10. It will thus be seen that all side draft is prevented by the combined operation of the several levers, eveners, and draw-bars, and the draft will be directly forward.

Having thus fully described my invention, I claim as new and desire to secure by Letters Patent—

1. In a draft-equalizer, the combination, with a pole, of a lever pivoted thereto, pulleys on the ends of the lever, chains passing over the pulleys and adapted to carry whiffletrees at their ends, a bar secured to the pole in the rear of the lever at about the middle of its length, a brace connecting one end of the bar with the pole, an evener-bar pivoted to the pole in rear of the said bar, a draw-bar pivoted to the evener-bar and to the lever, and a second draw-bar pivoted to the evener-bar and to the bar which is connected to the pole by a brace, substantially as described.

2. A draft-equalizer comprising a pole, a lever pivoted thereon and extending to one side thereof, means for preventing the forward movement of the lever, pulleys pivoted near the ends of the lever, a bell-crank pivoted on the lever and having arms of unequal length, and drawing-chains connected with the opposite arms of the bell-crank and with the whiffletrees, substantially as described.

3. A draft-equalizer comprising a pole, a lever pivoted thereon and extending to one side thereof, pulleys pivoted on the lever near the ends, a bell-crank pivoted on the lever, drawing-chains connected with the arms of the bell-crank and extending over the lever, parallel evener-bars pivoted on the pole in the rear of the lever, said evener-bars being connected at one end, draw-bars connecting one end of the rear evener-bar with the lever, and a brace extending from one end of the front evener-bar to the pole, substantially as described.

THEODOR J. MILAND.

Witnesses:
N. H. HOLDEN,
A. N. HOLDEN.